July 10, 1934.    G. H. STEVENS    1,966,149
LENS SHADE AND FILTER HOLDER FOR CAMERAS
Filed Dec. 21, 1933

Inventor
Guy H. Stevens

By Clarence A. O'Brien
Attorney

UNITED STATES PATENT OFFICE 1,966,149

LENS SHADE AND FILTER HOLDER FOR CAMERAS

Guy H. Stevens, Los Angeles, Calif.

Application December 21, 1933, Serial No. 703,485

1 Claim. (Cl. 88—1)

This invention relates to a combined lens shade and filter holder for cameras, the general object of the invention being to provide a funnel-shaped member and a coupling for attaching the member to the camera in front of the lens so that the member will shade the lens, with means whereby a filter can be held in place between the coupling and shade when desired.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
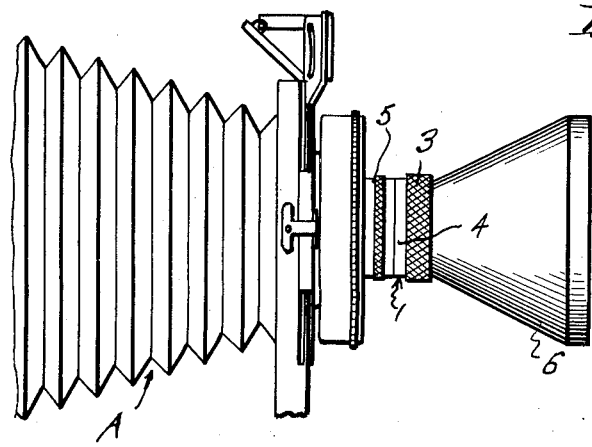
Figure 1 is an elevation of a part of the camera, showing the invention in use thereon.
Figure 2:
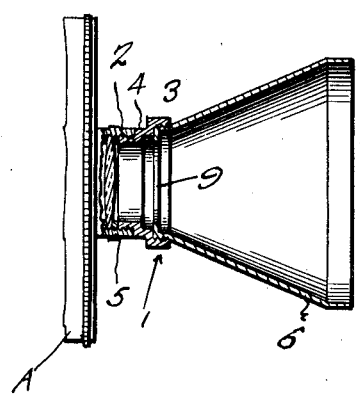
Figure 2 is a similar view, but showing the holder, coupling and a part of the lens barrel in section.
Figure 4:
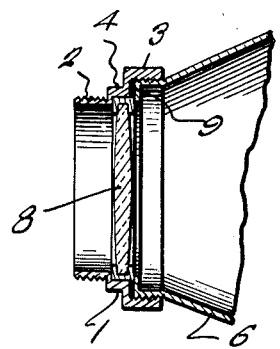
Figure 4 is a sectional detail view showing how the filter is held by the coupling and shade.
Figure 5:
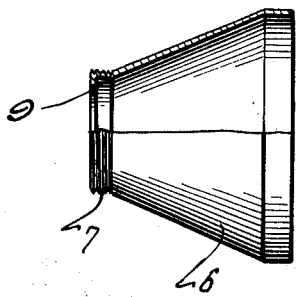
Figure 5 is a view partly in section of the shade.
Figure 3:
Figure 3 is a view partly in section of the coupling.

In this drawing, the numeral 1 indicates a coupling which has a reduced externally threaded end 2, a wide internally threaded end part 3 and an intermediate part 4 which is of less diameter than the part 3 and of greater diameter than the part 2. The part 2 is adapted to be threaded in the front end of the lens barrel 5 of the camera A and when the device is used without a filter, a substantially funnel-shaped member 6 has its externally threaded reduced end 7 threaded in the part 3 of the coupling, as shown in Figure 2. When the filter 8 is to be used, the member 6 is separated from the coupling and the filter placed in the intermediate part 4 of the coupling and then the funnel-shaped member or shade 6 is threaded in the part 3 and said shade 6 is formed with an internal flange 9 at its small end which will rest against a part of the filter to hold the same in place, as shown in Figure 4.

Thus this device will shade the camera lens the maximum degree from the stray light rays detrimental in photography and it will hold light filters in correct position when they are to be used. The device will also permit free operation of the diaphragm control, while in place, and it will leave the outside of the lens barrel free for use with other camera attachments.

A camera equipped with this invention can take pictures at any angle, no matter which way the camera is pointing.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

An attachment for a camera comprising a coupling having an exteriorly threaded reduced portion for engagement in the outer end of the lens barrel of a camera, the intermediate portion of said coupling forming a shoulder and the outer part being of greater diameter than the shoulder forming portion and being internally threaded, a shade of substantially funnel-shape having a reduced part at its small end exteriorly threaded to engage the internal threads at the outer end of the coupling, and said reduced part having an inwardly extending flange for engaging a filter placed against the shoulder of the coupling.

GUY H. STEVENS.